(12) United States Patent
Shin et al.

(10) Patent No.: US 7,027,065 B2
(45) Date of Patent: Apr. 11, 2006

(54) METHOD FOR IMAGE TEXTURE DESCRIBING

(75) Inventors: Hyun-doo Shin, Sungnam (KR); Yang-lim Choi, Paldal-gu (KR); Peng Wu, Santa Barbara, CA (US); Bangalore Manjunath, Santa Barbara, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/434,150

(22) Filed: May 9, 2003

(65) Prior Publication Data

US 2003/0193510 A1 Oct. 16, 2003

Related U.S. Application Data

(63) Continuation of application No. 09/497,504, filed on Feb. 4, 2000, now Pat. No. 6,624,821.

(60) Provisional application No. 60/118,740, filed on Feb. 5, 1999.

(51) Int. Cl.
*G09G 5/00* (2006.01)

(52) U.S. Cl. ..................................................... 345/582
(58) Field of Classification Search ................. 345/582, 345/585, 586, 588, 211 FOR; 382/108, 190, 382/260, 261, 262–265
See application file for complete search history.

(56) References Cited

U.S. PATENT DOCUMENTS 6,192,150 B1 * 2/2001 Leow et al. ................. 382/190
6,381,365 B1 * 4/2002 Murakawa .................. 382/190

FOREIGN PATENT DOCUMENTS

| JP | 04-329488 | 11/1992 |
| JP | 09-101970 | 4/1997 |
| JP | 9-251554 | 9/1997 |
| JP | 10-154149 | 6/1998 |

OTHER PUBLICATIONS

Manjunanth, Newsam, and Shin; 1999; UCSB; "A Texture Descriptor for Image Retrieval and Browsing"; 5 pages.*
Moshe Porat; Jan. 1989; IEEE; "Localized Texture Processing in Vision: Analysis and Synthesis in the Gaborian Space"; 16 page.*
Hamamoto, Uchimura, Watanabe, Yasuda, Mitani and Tomita; Apr. 1998; Pergamon; "A Gabor Filtiir–Bxsed Method for Recognizing Handwritten Numerals"; pp. 395–400.*
Manduchi and Portilla; Sep. 1999; IEEE; "Independent Component Analysis of Textures"; pp. 1054–1060.*

(Continued)

*Primary Examiner*—Matthew C. Bella
*Assistant Examiner*—G. F. Cunningham
(74) *Attorney, Agent, or Firm*—Sughrue Mion, PLLC

(57) ABSTRACT

A method for retrieving an image texture descriptor for describing texture features of an image, including the steps of (a) filtering input images using predetermined filters having different orientation coefficients, (b) projecting the filtered images onto axes of each predetermined direction to obtain data groups consisting of averages of each directional pixel values, (c) selecting candidate data groups among the data groups by a predetermined classification method, (d) determining a plurality of indicators based on orientation coefficients of the filters used in filtering the candidate data groups, and (e) determining the plurality of indicators as the texture descriptor of the image. The texture descriptors which allow kinds of texture structure present in an image to be perceptually captured can be retrieved.

15 Claims, 4 Drawing Sheets

OTHER PUBLICATIONS

Wu P. et al.: "A Texture Descriptor for Image Retrieval and Browsing" Content–Based Access of Image and Video Libraries, 1999. (CBAIVL '99). Proceedings. IEEE Workshop on Fort Collins, Co., USA, Jun. 22, 1999, Los Alamitos, CA, USA , IEEE Comput. Soc, US 1999, pp. 3–7, XP010343827 ISBN: 0–7695–0034–X.

Porat M. et al.: "Localized Texture Processing in Vision: Analysis and Synthesis in the Gaborian Space" IEEE Transactions on Biomedical Engineering, IEEE Inc. New York, US, vol. 36, No. 1, Jan. 1989, pp. 115–129, XP000120752 ISSN: 0018–9294 p. 120, right–hand, line 30–p. 122, right–hand column, line 17.

Hamamoto Y. et al.: "A Gabor filter–based method for recognizing handwritten numerals" Pattern Recognition, Pergamon Press Inc. Elmsford, N.Y. US., vol. 31, No. 4, Apr. 1, 1998, pp. 395–400, XP004108142 ISSN: 0031–3203, p. 395, left–hand column, line 13–right–hand column, line 20.

Manduchi R. et al.: "Independent Component Analysis of Textures" Proceedings of the Seventh IEEE International Conference on Computer Vision. (ICCV 99). Kerkyra, Greece, Sep. 20–27, 1999, International Conference on Computer Vision, Los Almitos, CA: IEEE Comp. Press, US, vol. 2 CONF 7 Sep. 20, 1999 pp. 1054–1060, XP000883734 ISBN: 0–7695–0165–6 p. 1055, left–hand column, line 32–p. 1057, right–hand column, line 2.

Institute of Electronics, Information and Communication Engineers (Mar. 25, 1995), vol., J78–D–II, pp., 437–444; Hierarchical Texture Analysis Using Gabor Functions, abstract only.

Institute of Electronics, Information and Communication Engineers Research Report (Sep. 29, 1995), vol., 95, No. 279, pp. 19–24, Texture–Image Segmentation using Gabor Filters, abstract only.

A. Perry, et al.,; "Segmentation of Textured Images"; Society Conference on Published: 1989; pp. 319–325.

J. Malik, et al.; "Finding Objects in Image Databases by Grouping"; Published: 1996; vol. 1; pp. 761–764.

T. Lindeburg, et al.; "Shape from Texture from a Multi–Scale Perspective"; Published: Apr. 1993; pp. 683–691.

Energy–based methods in vibroacoustics, Chair: Brian Mace & Eric Wester, Session EBM1b [online]. Monday Nov. 1998, [retrieved Oct. 29, 2002]. Retrieved from the Internet<URL: http://www2.auckland.ac.nz/internoise98/Tech/EBM_stream.htm>.

P. Wu, et al.; "A Texture Processing In Vision: Analysis and Synthesis in the Gaborian Space"; Published: Jan. 1989, vol. 36, No. 1, pp. 115–129.

M. Porat, et al.; "Localized Texture Processing In Vision: Analysis and Synthesis in the Gaborian Space"; Published: Jan. 1989, vol. 36, No. 1, pp. 115–129.

Y. Hamamoto, et al.; "A Gabor filter–based Method for Recognizing Handwritten Numerals"; Published: Apr. 1998, vol. 31, pp. 395–400.

R. Manduchi, et al.; Independent Component Analysis of Textures; Published: Sep. 1999, vol. 2 conference 7; pp. 1054–1060.

Japanese Office Action dated Apr. 20, 2004.

"Hierarchical Texture Analysis Using Gabor Expansion," IEICE Transactions, Institute of Electronics, Information and Communication Engineers, Mar. 25, 1995, vol. J78–D–11, No. 3, pp. 437–444.

* cited by examiner

METHOD FOR IMAGE TEXTURE DESCRIBING

REFERENCE TO RELATED APPLICATION

This is a continuation of application Ser. No. 09/497,504, filed Feb. 4, 2000 now U.S. Pat. No. 6,624,821, which claims benefit of Provisional Application No. 60/118,740, filed Feb. 5, 1999; the above noted prior applications are all hereby incorporated by reference.

BACKGROUND OF THE INVENTION

1. Field of the Invention

The present invention relates to a method and apparatus for retrieving an image texture descriptor, and more particularly, to an image texture descriptor retrieving method for retrieving a texture descriptor which is used in searching and browsing an image and describes texture characteristics of the image, and an apparatus thereof.

2. Description of the Related Art

Recently, image texture has emerged as important visual features for searching and browsing a large set of similar image patterns. For example, a conventional texture descriptor for filtering a texture descriptor by a Gabor filter extracts a texture descriptor consisting of coefficients obtained by Gabor filtering. However, although conventional image texture descriptors consist of numerous vectors, it is quite difficult to visually perceive texture structures from the texture descriptor.

SUMMARY OF THE INVENTION

It is an object of the present invention to provide a method for retrieving an image texture descriptor which can perceptually capture the texture structures present in an image.

It is another object of the present invention to provide a computer readable storage medium having a computer program stored therein, the program being arranged such that a computer executes the image texture descriptor retrieving method.

It is still another object of the present invention to provide an image texture descriptor retrieving apparatus which performs the image texture descriptor retrieving method.

To achieve the above object, there is provided a method for retrieving an image texture descriptor for describing texture features of an image, including the steps of (a) filtering input images using predetermined filters having different orientation coefficients, (b) projecting the filtered images onto axes of each predetermined direction to obtain data groups consisting of averages of each directional pixel values, (c) selecting candidate data groups among the data groups by a predetermined classification method, (d) determining a plurality of indicators based on orientation coefficients of the filters used in filtering the candidate data groups, and (e) determining the plurality of indicators as the texture descriptor of the image.

The step (a) may further include the step of (a-1) filtering input images using predetermined filters having different scale coefficients, and the step (d) further comprises the step of (d-1) determining a plurality of indicators based on scale coefficients of the filters used in filtering the candidate data groups.

The image texture descriptor retrieving method may further include the step of determining another indicator based on the presence of data groups filtered by filters having scale coefficients or orientation coefficients which are close to or identical with the scale coefficients or orientation coefficients of the filters used in filtering the selected candidate data groups.

The image texture descriptor retrieving method may further include the step of calculating the mean and variance of pixels with respect to the filtered images, and obtaining a predetermined vector using the calculated mean and variance.

According to another aspect of the present invention, there is provided a method for retrieving an image texture descriptor for describing texture features of an image, including the steps of (a) filtering input images using predetermined filters having different scale coefficients, (b) projecting the filtered images onto axes of each predetermined direction to obtain data groups consisting of averages of each directional pixel values, (c) determining a plurality of indicators based on scale coefficients of the filters used in filtering data groups selected among the data groups by a predetermined selection method, (d) determining the plurality of indicators as the texture descriptor of the image.

According to still another aspect of the present invention, there is provided a method for retrieving an image texture descriptor for describing texture features of an image, comprising the steps of (a) filtering input images using predetermined filters having different orientation coefficients and different scale coefficients, (b) projecting the filtered images onto horizontal and vertical axes to obtain horizontal-axis projection graphs and vertical-axis projection graphs, (c) calculating normalized auto-correlation values for each graph, (d) obtaining a local maximum and a local minimum for each normalized auto-correlation value, at which the calculated normalized auto-correlation values form a local peak and a local valley at a predetermined section, (e) defining the average of the local maximums and the average the local minimums as contrast, (f) selecting graphs in which the ratio of the standard deviation to the average of the local maximums is less than or equal to a predetermined threshold as first candidate graphs, (g) determining the type of the second candidate graphs according to the number of graphs filtered by the filters having scale coefficients or orientation coefficients which are close to or identical with the scale coefficients or orientation coefficients of the filters used in filtering the selected second candidate graphs, (h) counting the numbers of graphs belonging to the respective types of second candidate graphs and determining predetermined weights of each type of second candidate graphs, (i) calculating the sum of products of the counted numbers of graphs and the determined weights to determine the calculation result value as a first indicator constituting a texture descriptor, (j) determining the orientation coefficients and scale coefficients of the second candidate graphs having the biggest contrast as second through fifth indicators, and (k) determining indicators including the first indicator and the second through fifth indicators as the texture descriptors of the corresponding image.

The image texture descriptor retrieving method may further include the step of calculating the mean and variance of pixels with respect to the filtered images, and obtaining a predetermined vector using the calculated mean and variance, wherein the step (k) includes the step of determining indicators including the first indicator, the second through fifth indicators and the predetermined vector as the texture descriptors of the corresponding image.

The normalized auto-correlation, denoted by NAC(k), is preferably calculated by the following formula:

$$NAC(k) = \frac{\sum_{m=k}^{N-1} P(m-k)P(m)}{\sqrt{\sum_{m=k}^{N-1} P^2(m-k) \sum_{m=k}^{N-1} P^2(m)}}$$

wherein N is a predetermined positive integer, an input image consists of N×N pixels, a pixel position is represented by i, where i is a number from 1 to N, the projection graphs expressed by pixels of the pixel position i is represented by P(i) and k is a number from 1 to N.

The contrast is determined as:

$$\text{contrast} = \frac{1}{M}\sum_{i=1}^{M} P\_magn(i) - \frac{1}{L}\sum_{i=1}^{L} V\_magn(i)$$

wherein P_magn (i) and V_magn (i) are the local maximums and local minimums determined in the step (d).

In the step (f), the graphs satisfying the following formula are selected as first candidate graphs:

$$\frac{S}{d} \leq \alpha$$

wherein d and S are the average and standard deviation of the local maximums and α is a predetermined threshold.

The step (g) includes the sub-steps of (g-1), if there are one or more graphs having scale or orientation coefficients identical with those of a pertinent candidate graph and one or more graphs having scale or orientation coefficients close to those of the pertinent candidate graph, classifying the pertinent candidate graph as a first type graph, (g-2) if there are one or more graphs having scale or orientation coefficients identical with those of a pertinent candidate graph but there is no graph having scale or orientation coefficients close to those of the pertinent candidate graph, classifying the pertinent candidate graph as a second type graph, and (g-3) if there is no graph having scale or orientation coefficients identical with or close to those of a pertinent candidate graph, classifying the pertinent candidate graph as a third type graph.

The step (h) includes the step of counting the number of graphs belonging to each of the first through third types of graphs and determining predetermined weights for each of the types of graphs.

After the step of (f), there may be further included the step of applying a predetermined clustering algorithm to the first candidate graphs to select second candidate graphs.

The predetermined clustering algorithm is preferably modified agglomerative clustering.

Preferably, in the step (j), the orientation coefficient of a graph having the biggest contrast, among the horizontal-axis projection graphs, is determined as a second indicator; the orientation coefficient of a graph having the biggest contrast, among the vertical-axis projection graphs, is determined as a second indicator; the scale coefficient of a graph having the biggest contrast, among the horizontal-axis projection graphs, is determined as a fourth indicator; and the scale coefficient of a graph having the biggest contrast, among the vertical-axis projection graphs, is determined as a fifth indicator.

The step (j) may include the step of determining indicators including the first indicator, the second through fifth indicators and the predetermined vector as the texture descriptors of the corresponding image.

The predetermined filters preferably include Gabor filters.

To achieve the second object of the present invention, there is provided a computer readable medium having program codes executable by a computer to perform a method for an image texture descriptor for describing texture features of an image, the method including the steps of (a) filtering input images using predetermined filters having different orientation coefficients and different scale coefficients, (b) projecting the filtered images onto horizontal and vertical axes to obtain horizontal-axis projection graphs and vertical-axis projection graphs, (c) calculating normalized auto-correlation values for each graph, (d) obtaining a local maximum and a local minimum for each of normalized auto-correlation values, at which the calculated normalized auto-correlation values form a local peak and a local valley at a predetermined section, (e) defining the average of the local maximums and the average the local minimums as contrast, (f) selecting graphs in which the ratio of the standard deviation to the average of the local maximums is less than or equal to a predetermined threshold as first candidate graphs, (g) determining the type of the second candidate graphs according to the number of graphs filtered by the filters having scale coefficients or orientation coefficients which are close to or identical with the scale coefficients or orientation coefficients of the filters used in filtering the selected second candidate graphs, (h) counting the numbers of graphs belonging to the respective types of second candidate graphs and determining predetermined weights of each type of second candidate graph, (i) calculating the sum of products of the counted numbers of graphs and the determined weights to determine the calculation result value as a first indicator constituting a texture descriptor, (j) determining the orientation coefficients and scale coefficients of the second candidate graphs having the biggest contrast as second through fifth indicators, and (k) determining indicators including the first indicator and the second through fifth indicators as the texture descriptors of the corresponding image.

To achieve the third object of the present invention, there is provided an apparatus for retrieving an image texture descriptor for describing texture features of an image, the apparatus including filtering means for filtering input images using predetermined filters having different orientation coefficients, projecting means for projecting the filtered images onto axes of each predetermined direction to obtain data groups consisting of averages of each of the directional pixel values, classifying means for selecting candidate data groups among the data groups by a predetermined classification method, first indicator determining means for determining another indicator based on the number of graphs filtered by filters having scale coefficients or orientation coefficients which are close to or identical with the scale coefficients or orientation coefficients of the filters used in filtering the selected candidate graph, and second indicator determining means for determining a plurality of indicators based on scale coefficients and orientation coefficients of the filters used in filtering the determined candidate graphs.

Alternatively, there is provided an apparatus for retrieving an image texture descriptor for describing texture features of an image, the apparatus including a filtering unit for filtering input images using predetermined filters having different orientation coefficients and different scale coefficients, an image mean/variance calculating unit for calculating the mean and variance of pixels with respect to each of the filtered images, and obtaining a predetermined vector using the calculated mean and variance, a projecting unit for projecting the filtered images onto horizontal and vertical axes to obtain horizontal-axis projection graphs and vertical-axis projection graphs, a calculating unit for calculating a normalized auto-correlation value for each graph, a peak detecting/analyzing unit for detecting local maximums and local minimums for each auto-correlation value, at which the calculated normalized auto-correlation values forms a local peak and a local valley at a predetermined section, a mean/variance calculating unit for calculating the average of the local maximums and the average of the local minimums, a first candidate graph selecting/storing unit for selecting the graphs satisfying the requirement that the ratio of the standard deviation to the average of the local maximums be less than or equal to a predetermined threshold, as first candidate graphs, a second candidate graph selecting/storing unit for applying a predetermined clustering algorithm to the first candidate graphs to select the same as second candidate graphs, a classifying unit for counting the number of graphs belonging to each of the respective types of the second candidate graphs, outputting data signals indicative of the number of graphs of each type, determining predetermined weights of the graphs belonging to the respective types and outputting data signals indicative of weights to be applied to each type, a first indicator determining unit for calculating the sum of the products of the data representing the number of graphs belonging to each type, and the data representing the weights to be applied to each type, determining and outputting the calculation result as a first indicator constituting a texture descriptor, a contrast calculating unit for calculating the contrast according to formula (2) using the averages output from the mean/variance calculating unit and outputting a signal indicating that the calculated contrast is biggest, a second candidate graph selecting/storing unit for outputting the candidate graphs having the biggest contrast among the second candidate graphs stored therein in response to the signal indicating that the calculated contrast is biggest, a second-to-fifth indicator determining unit for determining the orientation coefficient of a graph having the biggest contrast, among the horizontal-axis projection graphs; the orientation coefficient of a graph having the biggest contrast, among the vertical-axis projection graphs, as a second indicator; the scale coefficient of a graph having the biggest contrast, among the horizontal-axis projection graphs, as a fourth indicator; and the scale coefficient of a graph having the biggest contrast, among the vertical-axis projection graphs, as a fifth indicator, and a texture descriptor output unit for combining the first indicator, the second through fifth indicators and the predetermined vector and outputting the combination result as the texture descriptors of the corresponding image.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Hereinafter, embodiments of the present invention will be described in detail with reference to the accompanying drawings.

Figure 1A:
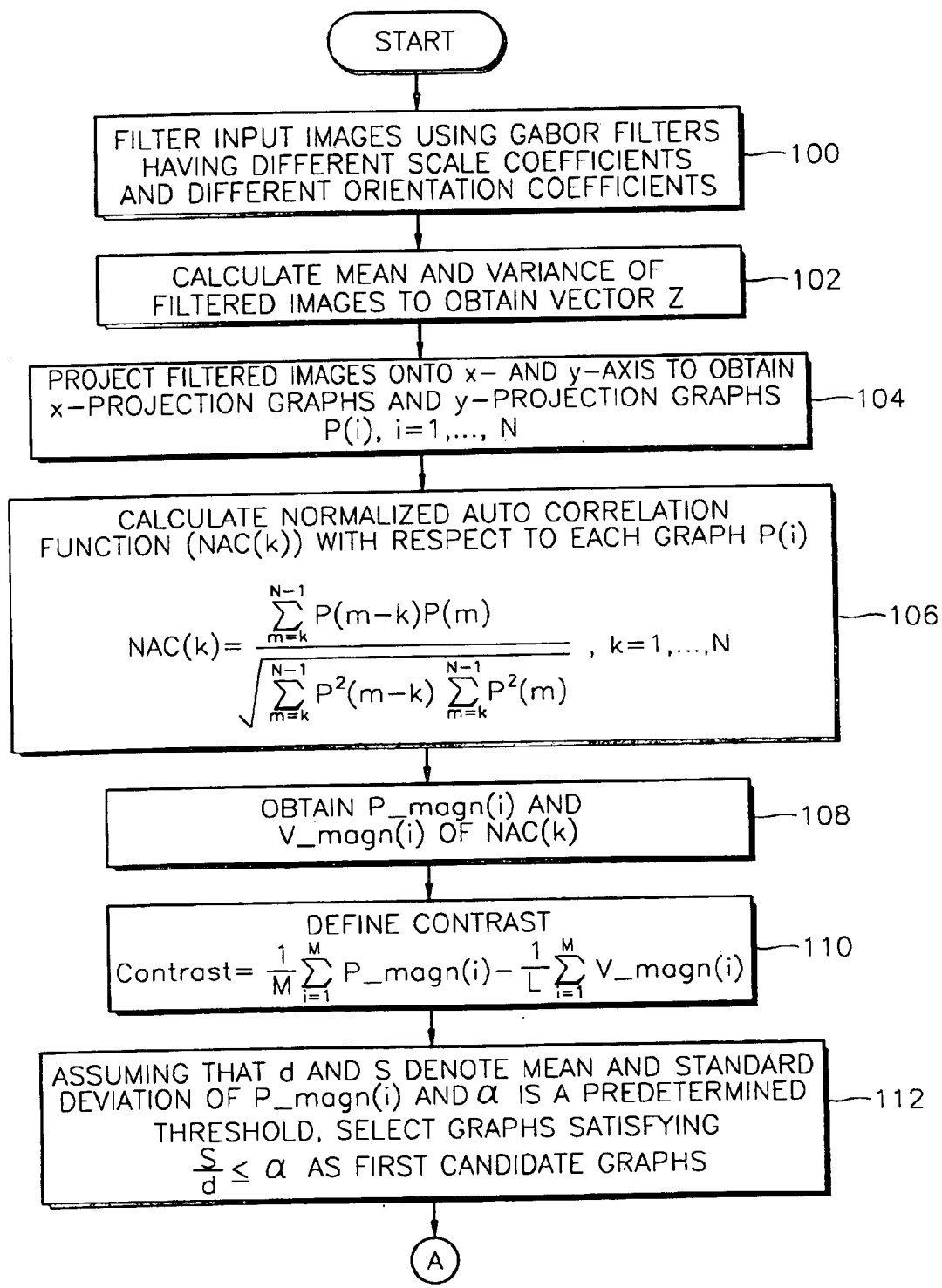
FIGS. 1A and 1B are flow diagrams showing an image texture descriptor retrieving method according to the present invention.

Referring to FIG. 1A showing an image texture descriptor retrieving method according to the present invention, assuming that N is a predetermined positive integer, an input image consisting of N×N pixels, for example, 128×128 pixels, is filtered using a Gabor filter (step 100). The Gabor filter is madeup of filters having different orientation coefficients and different scale coefficients. Assuming that C1 and C2 are predetermined positive integers, the input image is filtered by filters having C1 kinds of orientation coefficients and C2 kinds of scale coefficients, and the filters output C1×C2 kinds of filtered images.

Next, the mean and variance of pixels are calculated for each of the C1×C2 kinds of filtered images, and then a vector Z is obtained using the mean and variance (step 102).

Then, the filtered images are projected onto x- and y-axes to obtain x-projection graphs and y-projection graphs (step 104). The normalized auto-correlation (NAC) value for each graph P(i) (i is a number from 1 to N) denoted by NAC(k), is calculated by the following formula (1):

$$NAC(k) = \frac{\sum_{m=k}^{N-1} P(m-k)P(m)}{\sqrt{\sum_{m=k}^{N-1} P^2(m-k) \sum_{m=k}^{N-1} P^2(m)}} \quad (1)$$

wherein a pixel position is represented by i, the projection graphs expressed by pixels of the pixel position i are represented by P(i) and k is a number from 1 to N (N is a positive integer.).

Next, local maximums P_magn (i) and local minimums of V_magn (i), at which the calculated NAC(k) forms a peak and a valley locally at a predetermined section, are obtained (step 108).

Now, contrast is defined as the following formula (2):

$$\text{contrast} = \frac{1}{M}\sum_{i=1}^{M} P\_magn(i) - \frac{1}{L}\sum_{i=1}^{L} V\_magn(i) \quad (2)$$

(step 110).

Also, the graphs satisfying the following formula (3) are selected as first candidate graphs (step 112):

$$\frac{S}{d} \leq \alpha \quad (3)$$

wherein d and S are the average and standard deviation of the local maximums P_magni (i) and α is a predetermined threshold.

Figure 1B:
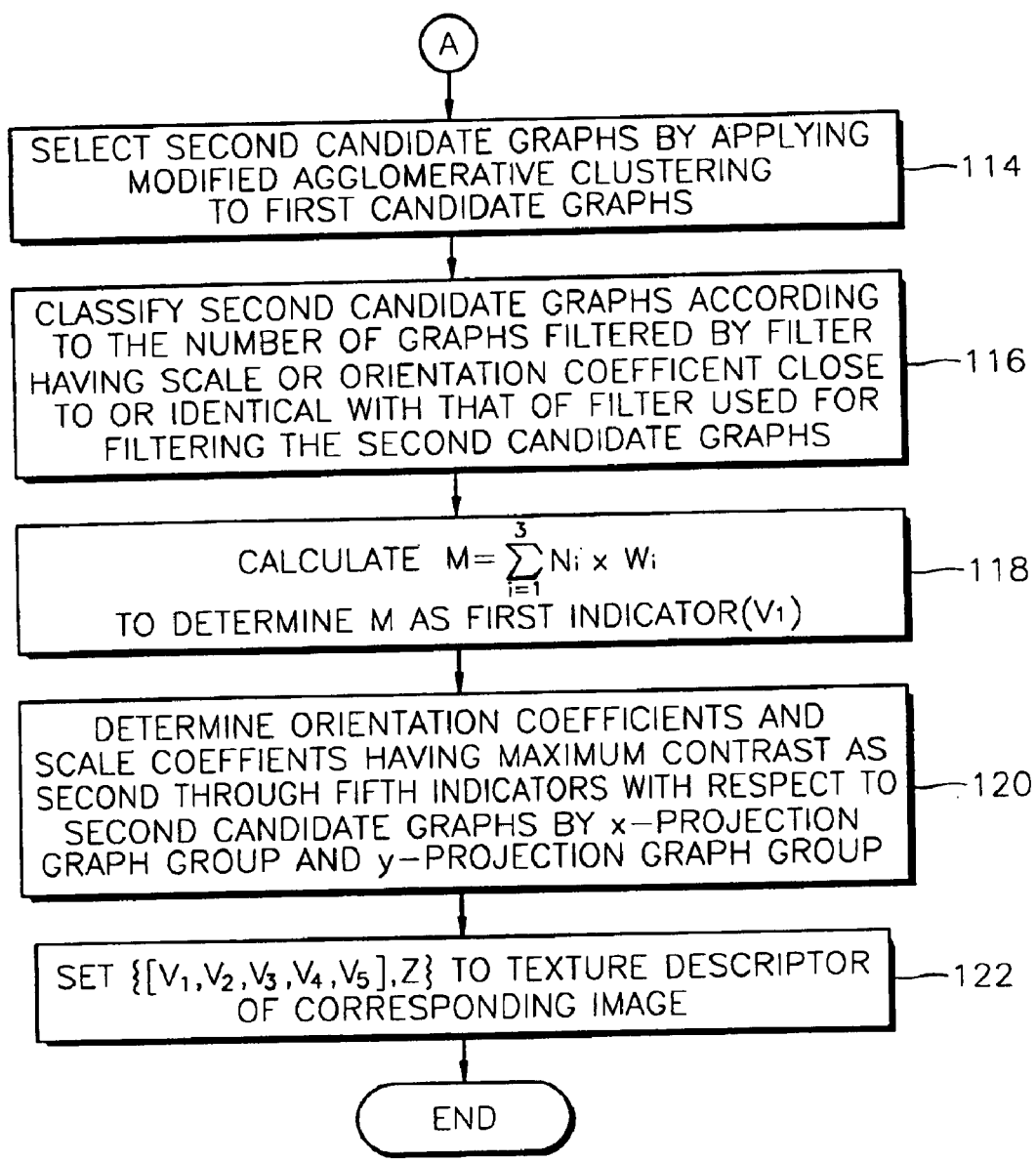

Referring to FIG. 1B, modified agglomerative clustering is applied to the first candidate graphs to select second candidate graphs (step 114). A modified agglomerative clustering algorithm is an appropriately modified algorithm of agglomerative clustering disclosed by R. O. Duda and P. E. Hart in "Pattern Classification and Scene Analysis, John Wiley and Sons, New York, 1973," which will now be described briefly. First, in N graphs $P_1, \ldots, P_N$, let the mean and standard deviation of distances between peaks be $d_i$ and $S_i$, and each graph have a two-dimensional vector corresponding to $(d_i, S_i)$. Now, $P_i$ is clustered using the two-dimensional vector corresponding to $(d_i, S_i)$ as follows. Assuming that the desired number of clusters is $M_c$, with respect to initial number of clusters N, each cluster $C_i$ can be expressed such that $C_1=\{P_1\}, C_2=\{P_2\}, \ldots, C_N=\{P_N\}$. If the number of clusters is smaller than $M_c$, clustering is stopped. Next, two clusters $C_i$ and $C_j$ which are most distant from each other are obtained. If the distance between $C_i$ and $C_j$ is greater than a predetermined threshold, clustering is stopped. Otherwise, $C_i$ and $C_j$ are merged to remove one of the two clusters. This procedure is repeatedly performed until the number of clusters reaches a predetermined number. Then, among the clustered clusters, the cluster having the most graphs is selected and graphs in the selected cluster are selected as candidate graphs.

Now, the second candidate graphs are classified into three types (step 116). The classification is performed according to the number of graphs filtered by a filter having scale or orientation coefficients which are close to or identical with those of a filter used for filtering the second candidate graphs. Hereinafter, for the sake of convenience, the graphs filtered by a filter having a certain scale coefficient or a constant orientation coefficient will be referred to as certain-scale-coefficient graphs or certain-orientation-coefficient graphs.

In more detail, first, in the case where there are one or more graphs having scale or orientation coefficients identical with those of a pertinent candidate graph and one or more graphs having scale or orientation coefficients close to those of the pertinent candidate graph, the pertinent candidate graph is classified as a C1 type graph. Second, in the case where there are one or more graphs having scale or orientation coefficients identical with those of a pertinent candidate graph but there is no graph having scale or orientation coefficients close to those of the pertinent candidate graph, the pertinent candidate graph is classified as a C2 type graph. Third, in the case where there is no graph having scale or orientation coefficients identical with or close to those of a pertinent candidate graph, the pertinent candidate graph is classified as a C3 type graph. Then, the numbers of graphs belonging to each of the C1, C2 and C3 types are counted to be denoted by $N_1$, $N_2$ and $N_3$, respectively, and the respective weights of the graphs belonging to each of the C1, C2 and C3 types are counted to be denoted by $W_1$, $W_2$ and $W_3$, respectively, which will be described below.

Now, using the determined numbers $N_1$, $N_2$ and $N_3$, and the weights $W_1$, $W_2$ and $W_3$, the following calculation is performed:

$$M = \sum_{i=1}^{3} N_i \times W_i \qquad (4)$$

wherein the result M is determined as a first indicator $V_1$ constituting a texture descriptor (step 118).

With respect to the second candidate graphs, the orientation coefficients and scale coefficients of graphs that have the biggest contrast are determined as second through fifth indicators (step 120). In more detail, the orientation coefficient of a graph having the biggest contrast, among the x-projection graphs, is determined as a second indicator $V_2$. Also, the orientation coefficient of a graph having the biggest contrast, among the y-projection graphs, is determined as a third indicator $V_3$. The scale coefficient of a graph having the biggest contrast, among the x-projection graphs, is determined as a fourth indicator $V_4$. Also, the scale coefficient of a graph having the biggest contrast, among the y-projection graphs, is determined as a fifth indicator $V_5$.

Using the first indicator $V_1$ determined in the step 118, the second through fifth indicators $V_2$, $V_3$, $V_4$ and $V_5$, and the vector Z determined in the step 102, the texture descriptor, that is, the texture feature vector, is set to $\{[V_1, V_2, V_3, V_4, V_5], Z\}$ (step 122).

A large first indicator $V_1$ indicates a high level of structuredness of the texture of an image. It has been experimentally confirmed that the first indicator $V_1$ represents quite well the structuredness of the texture of an image. The second and third indicators $V_2$ and $V_3$ represent two quantized orientations in which the structuredness is captured most. The fourth and fifth indicators $V_4$ and $V_5$ represent two quantized scales in which the structuredness is captured most.

The texture descriptor is used as an index of an image in browsing or searching-retrieval applications. Especially, the image texture descriptor retrieved by the image texture descriptor retrieving method according to the present invention is suitably used in checker marks in which browsing patterns are regular, or structure oriented browsing, i.e., or embroidery patterns. Thus, in searching structurally similar patterns, image searching which is more adaptable to eye-perception is allowed by applying the image texture descriptor retrieving method according to the present invention to the applications based on the structured oriented browsing. Therefore, among indicators constituting texture descriptors retrieved by the image texture descriptor retrieving method according to the present invention, the first through fifth indicators $V_1$, $V_2$, $V_3$, $V_4$ and $V_5$ can be referred to as perceptual browsing components (PBCs).

Also, with respect to each filtered image, the mean and variance of pixel values are calculated. The vector Z obtained by using the mean and variance can be referred to as similarity retrieval components (SRCs).

In other words, in the image texture descriptor retrieving method according to the present invention, the texture descriptor allows the kinds of texture structures present in an image to be perceptually captured.

It has been described that a first indicator V1, which is a quite a good indicator of the structuredness of the texture of an image, the second and third indicators V2 and V3, representing two quantized orientations in which the structuredness is captured most, and the fourth and fifth indicators V4 and V5 representing two quantized scales in which the structuredness is captured most, are used as the texture descriptors of the image. However, the above-described embodiment is used in a descriptive sense only and not for the purpose of limitation. A single indicator that is most suitable to the characteristics of an image and arbitrarily selected plural indicators can also be used as the texture descriptor(s) of the image. Therefore, the above-described embodiment is not intended as a restriction on the scope of the invention.

Also, the image texture descriptor retrieving method is programmable as a computer program. Codes and code segments constituting the computer program can be easily derived by a computer programmer in the art. Also, the program is stored in computer readable media and is readable and executable by the computer, thereby embodying the image texture descriptor retrieving method. The media include magnetic recording media, optical recording media, carrier wave media, and the like.

Figure 2:
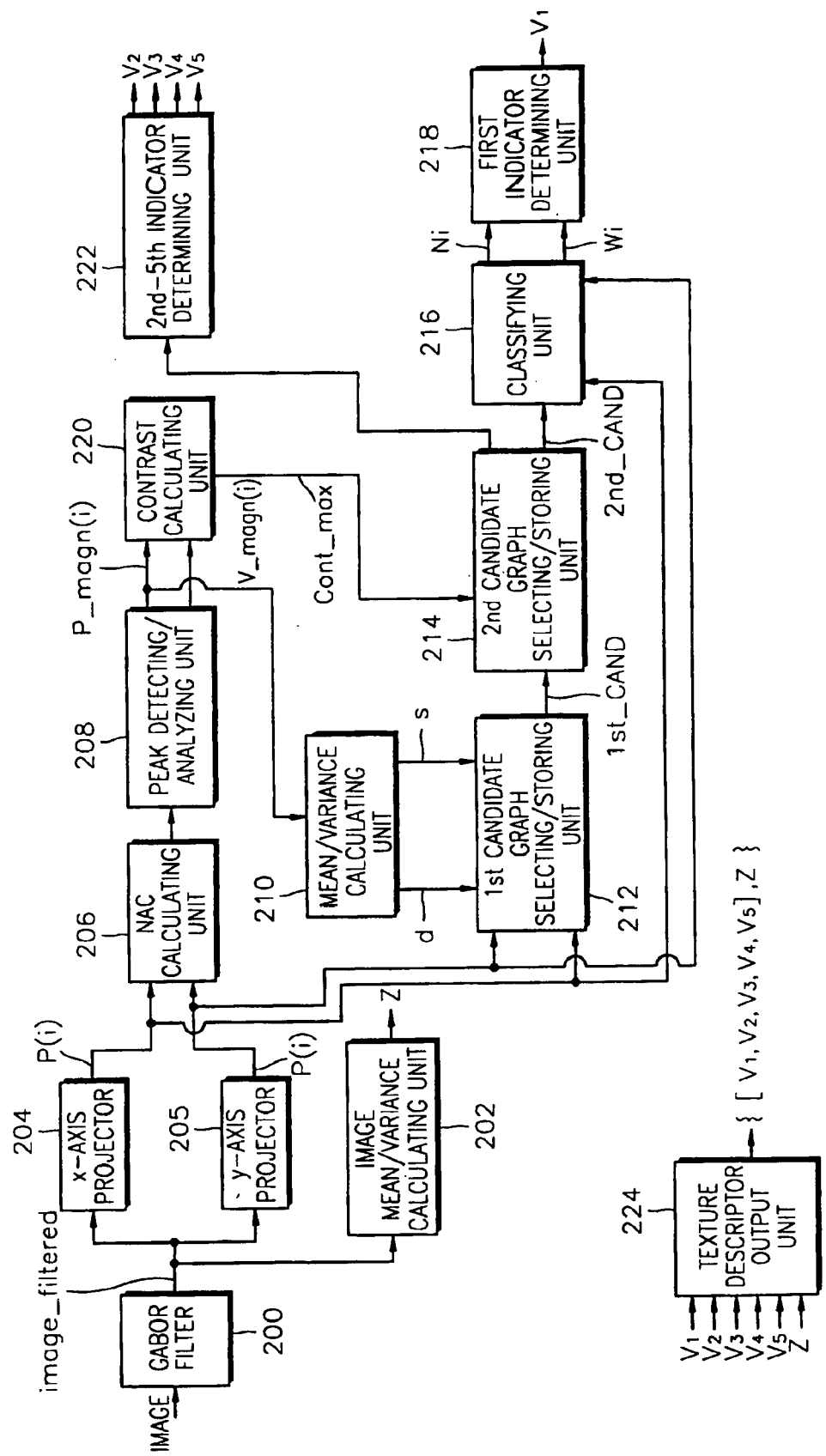
FIG. 2 is a block diagram of an image texture descriptor retrieving apparatus according to the present invention.

Also, the image texture descriptor retrieving method can be embodied by an image texture descriptor retrieving apparatus. FIG. 2 is a block diagram of an image texture descriptor retrieving apparatus according to the present invention. Referring to FIG. 2, the image texture descriptor retrieving apparatus includes a Gabor filer 200, an image mean/variance calculating unit 202, an x-axis projector 204, a y-axis projector 205, an NAC calculating unit 206 and a peak detecting/analyzing unit 208. Also, the image texture descriptor retrieving apparatus includes a mean/variance calculating unit 210, a first candidate graph selecting/storing unit 212, a second candidate graph selecting/storing unit 214, a classifying unit 216, a first indicator determining unit 218, a contrast calculating unit 220, a second-to-fifth indicator determining unit 222 and a texture descriptor output unit 224.

In the operation of the image texture descriptor retrieving apparatus, assuming that N is a predetermined positive integer, the Gabor filter 200 filters an input image consisting of N×N pixels, for example, 128×128 pixels using filters (not shown) having different orientation coefficients and different scale coefficients, and outputs filtered images (image_filtered). Assuming that C1 and C2 are predetermined positive integers, the input image is filtered by filters having C1 kinds of orientation coefficients and C2 kinds of scale coefficients, and the filters output C1×C2 kinds of filtered images.

The image mean/variance calculating unit 202 calculates the mean and variance of pixels for each of the C1×C2 kinds of filtered images, to then obtain a vector Z using the mean and variance and outputs the obtained vector Z.

The x-axis projector 204 and the y-axis projector 205 project the filtered images onto x- and y-axes to obtain x-projection graphs and y-projection graphs. In other words, suppose a pixel position is represented by i (i is a number from 1 to N), the x-axis projector 204 and the y-axis projector 205 output the projection graphs P(i) expressed by pixels of the pixel position i (i–1, . . . , N).

The NAC calculating unit 206 calculates the normalized auto-correlation (NAC) value for each graph P(i), denoted by NAC(k), using the formula (1).

The peak detecting/analyzing unit 208 detects local maximums P_magn (i) and local minimums of V_magn (i), at which the calculated NAC(k) forms a local peak and a local valley at a predetermined section.

The mean/variance calculating unit 210 calculates the mean d and standard deviation S of the local maximums P_magn (i) and outputs the same. The first candidate graph selecting/storing unit 212 receives the mean d and standard deviation S, selects the graphs satisfying the formula (3) as first candidate graphs (1st_CAND) and stores the selected first candidate graphs, in which α is a predetermined threshold.

The second candidate graph selecting/storing unit 214 applies modified agglomerative clustering to the first candidate graphs to select the same as second candidate graphs (2nd_CAND).

The classifying unit 216, as described with reference to FIG. 1B. counts the numbers of graphs belonging to each of the C1, C2 and C3 types to denote the same by $N_1$, $N_2$ and $N_3$, respectively, with respect to the second candidate graphs, and outputs data signals $N_i$ indicative of the number of graphs of each type. Also, the classifying unit 216 determines the weights of the graphs belonging to each of the C1, C2 and C3 types to then denote the same by $W_1$, $W_2$ and $W_3$, respectively, and outputs data signals $W_i$ indicative of weights to be applied to each type.

The first indicator determining unit 218 calculates M as represented by the formula (4) using the determined numbers $N_1$, $N_2$ and $N_3$, and the weights $W_1$, $W_2$ and $W_3$, and determines and outputs the calculation result as a first indicator $V_1$ constituting a texture descriptor.

The contrast calculating unit 220 calculates the contrast by the formula (2) and outputs a signal Cont_max indicating that the calculated contrast is biggest.

The second candidate graph selecting/storing unit 214 outputs the candidate graphs having the biggest contrast among the second candidate graphs stored therein to the second-to-fifth indicator determining unit 222.

The second-to-fifth indicator determining unit 222 determines the orientation coefficients and scale coefficients of graphs that have the biggest contrast as second through fifth indicators. In other words, the orientation coefficient of a graph having the biggest contrast, among the x-projection graphs, is determined as a second indicator $V_2$. Also, the orientation coefficient of a graph having the biggest contrast, among the y-projection graphs, is determined as a second indicator $V_3$. The scale coefficient of a graph having the biggest contrast, among the x-projection graphs, is determined as a fourth indicator $V_4$. Also, the scale coefficient of a graph having the biggest contrast, among the y-projection graphs, is determined as a fifth indicator $V_5$.

The texture descriptor output unit 224 sets and outputs the texture descriptor, that is, the texture feature vector, as $\{[V_1, V_2, V_3, V_4, V_5], Z\}$, using the first indicator $V_1$ output from the first indicator determining unit 218, the second through fifth indicators $V_2$, $V_3$, $V_4$ and $V_5$ output from the second-to-fifth indicator determining unit 222 and the vector Z output from the image mean/variance calculating unit 202.

Figure 3:
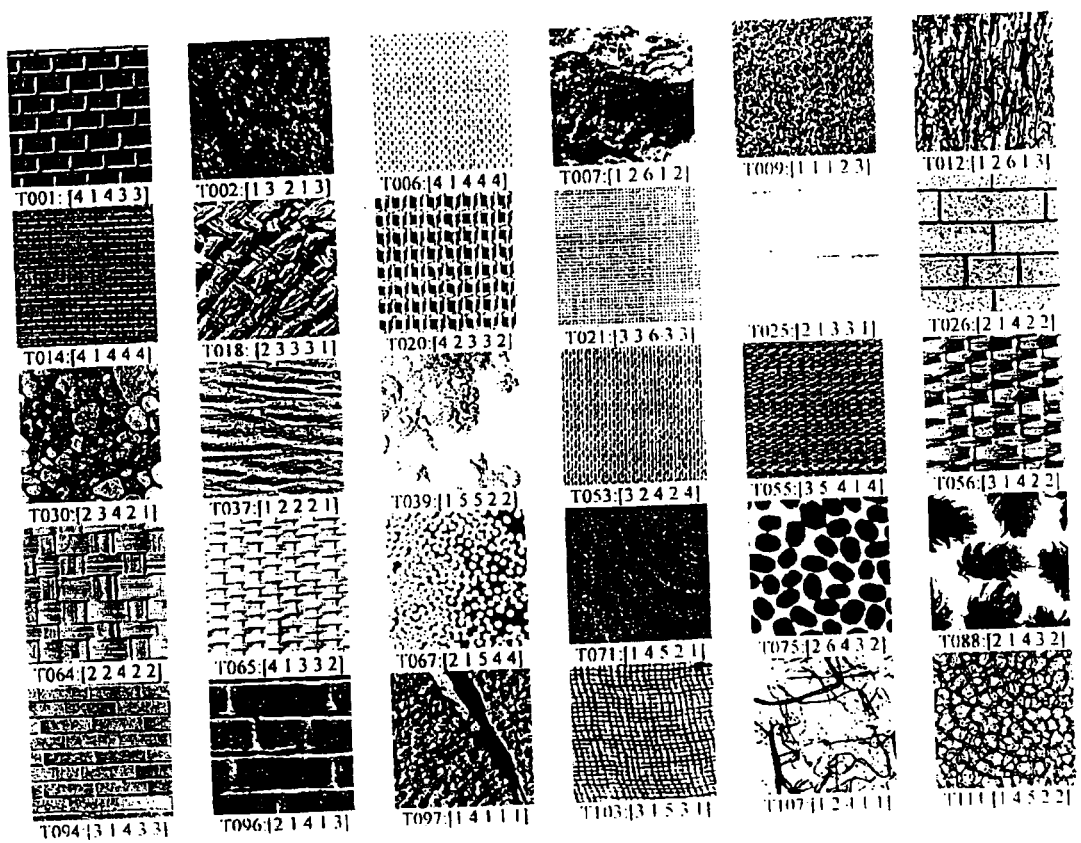
FIG. 3 shows perceptual browsing components (PCBs) extracted from Brodatz texture images by simulation based on the image texture descriptor retrieving method according to the present invention.

FIG. 3 shows perceptual browsing components (PBCs) extracted from Brodatz texture images by simulation based on the image texture descriptor retrieving method according to the present invention.

As described above, according to the image texture descriptor retrieving method of the present invention, texture descriptors which allow the kinds of texture structure present in an image to be perceptually captured can be retrieved.

What is claimed is:

1. A method for describing texture features of an image, comprising the steps of:
   (a) generating a regularity indicator indicating regularity of the image;
   (b) generating a direction indicator indicating direction of the image;
   (c) generating a scale indicator indicating scale of the texture element of the image; and
   (d) determining the regularity indicator, the direction indicator and the scale indicator as a texture descriptor of the image;
   wherein the step (a) comprises generating the regularity indicator expressing the regularity of the image as one of values, "irregular", "slightly irregular", "regular" and "highly regular".

2. The describing method according to claim 1, wherein the step (a) comprises generating the regularity indicator expressing the regularity of the image as one of a plurality of predetermined values.

3. The describing method according to claim 1, wherein the step (a) comprises generating the regularity indicator which is quantized integer.

4. The describing method according to claim 1, wherein the step (b) comprises generating the direction indicator expressing the direction as one of a plurality of predetermined values.

5. The describing method according to claim 1, wherein the step (b) comprises generating the direction indicator expressing the direction as one of values, "no directionality", "0 degrees", "30 degrees", "60 degrees", "90 degrees", "120 degrees", and "150 degrees".

6. The describing method according to claims 1, wherein the step (b) comprises generating the direction indicator which is a quantized integer.

7. The describing method according to claims 1, wherein the step (c) comprises generating the scale indicator expressing the scale as one of a plurality of predetermined values.

8. The describing method according to claim 1, wherein the step (c) comprises generating the scale indicator expressing the scale as one of values, "fine", "medium", "coarse", and "very coarse".

9. The describing method according to claim 1, wherein the step (c) comprises generating the scale indicator which is a quantized integer.

10. The describing method according to claim 1, wherein the step (d) comprises determining the texture descriptor of the image as a vector based on the regularity indicator, the direction indicator and the scale indicator.

11. The describing method according to claim 1, wherein the step (b) comprises generating the direction indicator featuring a dominant direction of the image.

12. The describing method according to claim 11, wherein the step (c) comprises generating the scale indicator featuring a scale corresponding to the dominant direction of the image.

13. The describing method according to claim 1, wherein the step (b) comprises generating a first direction indicator and a second direction indicator featuring a first dominant direction of the image and a second dominant direction of the image, respectively.

14. The describing method according to claim 13, wherein the step (c) comprises generating a first scale indicator featuring a scale corresponding to the first dominant direction of the image and a second scale indicator featuring a scale corresponding to the second dominant direction of the image.

15. The describing method according to claim 14, wherein the step (d) comprises determining the texture descriptor of the image as a vector based on the regularity indicator, the first direction indicator, the second direction indicator, the first scale indicator, and the second scale indicator.

* * * * *